United States Patent
Pitkänen (10) Patent No.: US 10,817,140 B2
(45) Date of Patent: Oct. 27, 2020

(54) SEQUENTIAL DATA

(71) Applicant: Trimble Solutions Corporation, Espoo (FI)

(72) Inventor: Henri Pitkänen, Espoo (FI)

(73) Assignee: Trimble Solutions Corporation, Espoo (FI)

( * ) Notice: Subject to any disclaimer, the term of this patent is extended or adjusted under 35 U.S.C. 154(b) by 51 days.

(21) Appl. No.: 16/161,418

(22) Filed: Oct. 16, 2018

(65) Prior Publication Data

US 2019/0114041 A1  Apr. 18, 2019

(30) Foreign Application Priority Data

Oct. 16, 2017 (FI) .................................. 20170141

(51) Int. Cl.

| | | |
|---|---|---|
| *G06F 3/0482* | (2013.01) | |
| *G06K 9/62* | (2006.01) | |
| *G06F 11/34* | (2006.01) | |
| *G06F 16/26* | (2019.01) | |
| *G06F 16/2458* | (2019.01) | |

(52) U.S. Cl.
CPC ........ *G06F 3/0482* (2013.01); *G06F 11/3438* (2013.01); *G06F 11/3476* (2013.01); *G06F 16/2458* (2019.01); *G06F 16/2465* (2019.01); *G06F 16/26* (2019.01); *G06K 9/6297* (2013.01)

(58) Field of Classification Search
CPC .... G06F 3/0482; G06F 16/2458; G06F 16/26; G06F 16/2465; G06F 11/3476; G06F 11/3438; G06F 11/3075; G06F 17/40; G06F 16/901; G06K 9/6297

USPC ........................................................ 715/710
See application file for complete search history.

(56) References Cited

U.S. PATENT DOCUMENTS

| | | | |
|---|---|---|---|
| 5,333,302 A | | 7/1994 | Hensley et al. |
| 6,606,613 B1 * | | 8/2003 | Altschuler ............. G06Q 10/10 |
| | | | 706/21 |
| 2006/0031465 A1 | | 2/2006 | Ahya et al. |
| 2011/0099182 A1 | | 4/2011 | Hayner et al. |
| 2013/0346917 A1 | | 12/2013 | Bragdon et al. |

(Continued)

FOREIGN PATENT DOCUMENTS

JP        4670056 B2     4/2011

OTHER PUBLICATIONS

Guzdial, M., "Deriving Software Usage Patterns from Log Files." GVU Center Technical Reports, Atlanta, Georgia Tech Library [online], 1993, vol. 537, pp. 1-14. Retrieved on Jan. 17, 2017, retrieved from https://smartech.gatech.edu/handle/1853/3650.

(Continued)

*Primary Examiner* — Andrey Belousov
(74) *Attorney, Agent, or Firm* — Kilpatrick Townsend & Stockton LLP (57) ABSTRACT

Mechanisms to create and/or use sequential data comprising a plurality of sequences are disclosed. A sequence comprises in a standard format at least a start user interface interaction and possible further user interface interactions between the start user interface interaction and an end event. The sequence may comprise the end event as well. An end event may be a user interface interaction performed when a user has used a creation oriented application or an indication of a maximum time between consecutive user interface interactions expiring.

22 Claims, 4 Drawing Sheets

(56) References Cited

U.S. PATENT DOCUMENTS

2016/0034822 A1   2/2016   Mariano et al.
2016/0179986 A1   6/2016   Clarysse et al.

OTHER PUBLICATIONS

Li, W. et al., "Design and Evaluation of a Command Recommendation System for Software Applications," ACM Transactions on Computer-Human Interaction, vol. 18, No. 2, Article 6, Publication date Jun. 2011, 35 pages, ACM Digital Library New York. Retrieved on Jan. 21, 2018, retrieved from https://dl.acm.org/citation.cfm?id=1970380.

Finnish Search Report for Application No. 20170141, dated Jan. 24, 2018, 2 pages.

\* cited by examiner

SEQUENTIAL DATA

RELATED APPLICATIONS

This application claims priority to Finnish patent application no. 20170141, filed on Oct. 16, 2017, the contents of which is hereby incorporated herein by reference in its entirety.

FIELD

The present invention relates generally to utilizing log information on how users are using a software application, especially a creation oriented application.

BACKGROUND

A creation oriented application is an application that contains a variety of tools and features enabling versatile alternatives for a user to use the application. Building Information Modeling (BIM) applications are examples of creation oriented applications. BIM is a process including the generation and management of digital representations of physical and functional characteristics of physical spaces. BIM applications are creation oriented applications that allow a user to work according to his/her own vision and rules. Current BIM applications are used by individuals, businesses and government authorities who plan, design, construct, operate and maintain diverse physical infrastructures, from water, wastewater, electricity, gas, refuse and communication utilities to roads, bridges and ports, from houses, apartments, schools and shops to offices, factories, warehouses, etc. In this workflow, the stakeholders are working in a 3D environment (or 4D if time is taken into account, or 5D if costs also are taken into account) creating and obtaining information rich data (Geometric objects that contain attribute data such as name and ID) and visualizations. The data created during design processes may also cover a dimension of the time and schedule constraint in construction modeling, and a dimension of cost in construction modeling. The versatile possibilities and ways to use a BIM application, as any creation oriented application, means that there is no user-independent one optimal way how to use an application, or a certain tool within the application; each user has her/his own preferred way to the application. Therefore there is no certainty how different users are using the creation oriented application and what kind of workflows emerge among different users. Having this information automatically would facilitate several tasks

SUMMARY

The invention relates to methods and apparatuses, which are characterized by what is stated in the independent claims. The preferred embodiments are disclosed in the dependent claims.

An aspect introduces a collection of sequential data comprising a plurality of sequences created from raw data in a plurality of log entries on collected user interface interactions with order information indicating their order of occurrence. A sequence comprises in a standard format at least a start user interface interaction. The sequence may also comprise an end event and/or one or more user interface interactions that occurred between the start user interface interaction and the end event. The end event may be a specific user interface interaction or an indication of a maximum time between consecutive user actions expiring or a detection that there are no further log entries.

BRIEF DESCRIPTION OF THE DRAWINGS

In the following different embodiments of the invention will be described in greater detail with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to be used for and/or with any application configured or configurable to track (collect) user interface interactions. Examples of such applications are creation oriented applications, such as different BIM applications, desktop publishing applications, and other expert system applications. As said above, a creation oriented application is an application that allows a user to work according to his/her own vision and rules to achieve a result. Further, there is no user-independent best way to achieve the result due to the variety of tools, features and user preferences of them. In expert systems also some boundary conditions relating to the field of the use/expertise have to be taken into account by the user, assisted preferably by the expert system application. Examples for boundary conditions for structural engineering include national regulations, such as those relating to load bearing, etc.

Figure 1:
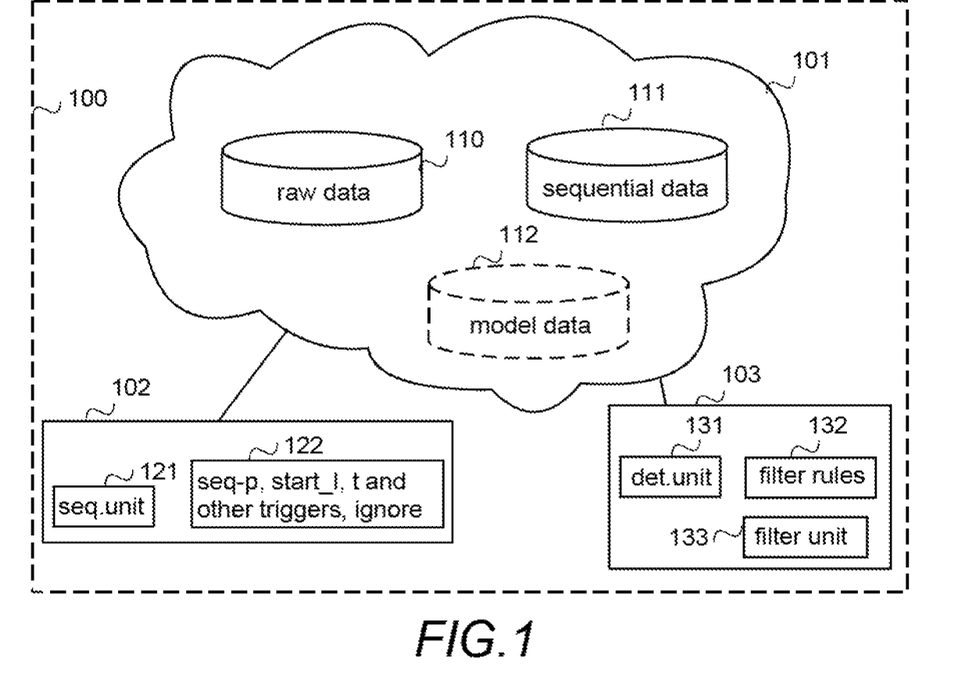
FIG. 1 shows a simplified architecture of an exemplary system and a schematic block diagrams of some apparatuses.

FIG. 1 illustrates a simplified system describing only some logical units with their operative connections, the implementation of which may deviate from what is presented. It is obvious to a person skilled in the art that the system may also comprise other functions and structures that need not be described in greater detail here. The more detailed structure of the system is irrelevant to the actual invention.

The system 100 illustrated in FIG. 1 is a simplified computing environment that comprises a data storage 101 and one or more apparatuses 102, 103 (only two shown in FIG. 1) connected to the data storage 101.

The data storage 101 may be any kind of conventional or future data repository, including distributed and centralized storing of data, managed by any suitable management system forming part of the computing environment. An example of distributed storing includes a cloud-based storage in a cloud environment (which may be a public cloud, a community cloud, a private cloud, or a hybrid cloud, for example). Cloud storage services may be accessed through a co-located cloud computer service, a web service application programming interface (API) or by applications that utilize API, such as cloud desktop storage, a cloud storage gateway or Web-based content management systems. However, the implementation of the data storage 101, the manner how data is stored, retrieved and updated, are irrelevant to the invention.

The data storage 101 comprises in the illustrated example a database 110 for raw data, a database 111 for sequential data and a database 112 for model data. Depending on an implementation, the data storage 101 may be a global data storage, a country-specific data storage, a company-specific data storage, or a department-specific data storage, for example. Further examples include that the data storage or the databases comprises different types of data, for example company-specific and department-specific, or even user-specific. In one scenario the database 110 for raw data is a global database, whereas there are plurality of databases 111 for sequential data comprising data for different levels, such as for a company, and for departments in the company, and the database 112 for model data is a company-specific database. The above are just mere examples illustrating that any scenario is possible.

The raw data means herein at least all user interface interactions collected as an automated background operation from apparatuses used by the users when a creation oriented application is running. In other words, herein the raw data is raw event data. Below term "raw data" is used for the sake of clarity. Herein, a user interface interaction includes any input of one of plurality of different commands, actions and values to different attribute fields as well as use of user interface means, like a click of a mouse or pointer. The raw data is collected (tracked) with order information indicating at least order in which the user interface interactions occurred. The order information may be time information. The time information may indicate for each user interface interaction a time, an occurrence time, when the user interface interaction was performed, the time being recorded by the apparatus used by the user. Other examples of the order information include running number, or corresponding information, indicating a position of the user interface interaction in the chain of user interface interactions, occurrence order, or occurrence order with time information indicating time lapsed between two consecutive user interface interactions. Typically the automatic data collection (automated raw data collection, automatic user feedback) is performed on users' consent, and the users are aware, even though they do not notice, that the interaction data is collected. For example, when a user first time starts to use the creation oriented application, a permission to collect user interface interactions is asked. However, the actual manner how the raw data is collected is irrelevant to the invention, it suffices that there is raw data. Herein it is assumed that the raw data is collected in a form of log files, and the term log file should be understood to cover all possible ways to store collected (tracked) user data. Naturally the raw data may also comprise other information than the information described above.

The sequential data means herein data processed from the raw data by one or more apparatuses 102 configured to create sequential data according to what is disclosed below in more detail. A sequence is an ordered list of nominal values, and the sequential data comprises a plurality of sequences. Herein a sequence comprises a set of user interface interactions, possibly associated with additional information, in an occurrence order, as will be described in more detail herein. The occurrence order typically reflects the order of user interface interactions in time.

The database 112 for the model data is depicted with hashed lines since in some embodiments the model data is accessible to be used to create the sequential data, and in some other embodiments the model data is not accessible to be used. For example, access to the model data may be limited only to those involved in the modeling in which case those in product development of the creation oriented application has no access to the model data. Further, the raw data may comprise also at least part of the model data information, and hence no access to the model data is needed. Using a building information application as an example of the creation oriented application, the model data may comprise information on an assembly, one or more parts used for the assembly, and one or more tools used. An assembly refers to a building object that represents a structure and comprises one or more parts. Examples of assemblies include a wall, a plate, a column, a beam, a panel, a slab, and connections treated as single units. A part refers to a building object that is a basic object that can be modeled and detailed further. Examples of parts include outer wall side, inner wall side and insulation between them, the slab, the column, etc. In other words, the assembly that represent one part may have a similar name. A tool refers to a specific functionality of the building information applications that is used for creating a group of model objects that are easy to model and modify as a single unit. A tool typically contains a user interface via which values may be adjusted before the tool is executed. The group of model objects may be a detail or an object connection. Examples of tools include wall reinforcement tool, wall opening reinforcement tool, wall end reinforcement tool, bolted moment tool, and a splice tool. The assembly may be a kind of a name of a structural object, for example "wall element", the parts may include different parts of the structural object, like an inside wall, outside wall, and the tools may include the detailing (openings, reinforcement, etc.). In addition to the assembly, part and tool information, environment information, like country, or material information, like concrete or steel, may be stored to the model data as separate information. Further, each added object may comprise a unique identifier, like a globally unique identifier, GUID. Another example of model data comprises model object properties, like name, profile and material. It should be appreciated that model data, or application context data, or any corresponding data created by creation oriented application and comprising data representing what has been created, may comprise any other information, the previous examples are just to illustrate, not to limit, what the model data may comprise.

Although depicted as separate database, in some implementations the raw data, i.e. collected user interface interactions, may comprise also corresponding model data, or some pieces of it, in one or more log entries, collected correspondingly as the raw data.

Further, it should be appreciated that a database means herein a collection of data. For example, terms "sequential database", and "database for sequential data" covers herein any kind of a collection of sequential data. The same applies to other databases and data stored therein.

The apparatuses 102, 103 may be any computing devices that can be configured to perform at least part of functionalities described below. Examples of such apparatuses include a user terminal or a work station, such as a laptop, a smartphone, a personal computer, a tablet computer, a field device, a virtual reality device, augmented reality (AR) interface device, a web client, or a server, like a cloud server or a grid server.

In the illustrated exemplified system 100 one of the two apparatuses depicted is configured to create sequential data. For that purpose the apparatus 102 comprises a sequential detection unit 121 (seq.unit) and in a local runtime memory 122 different temporary information. Examples of temporary information for the sequential detection unit include triggers, such as user interface interactions and a maximum time delay t to detect end, user interface interactions to be ignored (called herein also ignore events), a sequence position tracker (seq_p) and a list called start_l. The maximum time delay t to detect end may also be a preset value stored for the memory more permanently, that may be used as a default value if no other user input is received, or as a preset value (i.e. the user is not prompted to provide a value).

Further, in the illustrated exemplified system 100 one of the apparatuses depicted is configured to detect from the sequential data, after possible filtering it before, repetitive patterns and to use it for one or more specific purposes. For that purpose the apparatus 103 comprises a determination unit 131 (det.unit), filter unit 133 and in a local memory 132 one or more filter rules for the filtering unit, stored either temporarily or to be used several times. However, it should be appreciated that there may be apparatuses 103 comprising the determination unit 131 but not the filtering unit 133 and the filtering rules.

Naturally there may be a plurality of apparatuses corresponding to apparatus 102 and/or a plurality of apparatuses corresponding to apparatus 103 and/or a plurality of apparatuses comprising the sequential detection unit 122 and the filtering unit 133.

Figure 2:
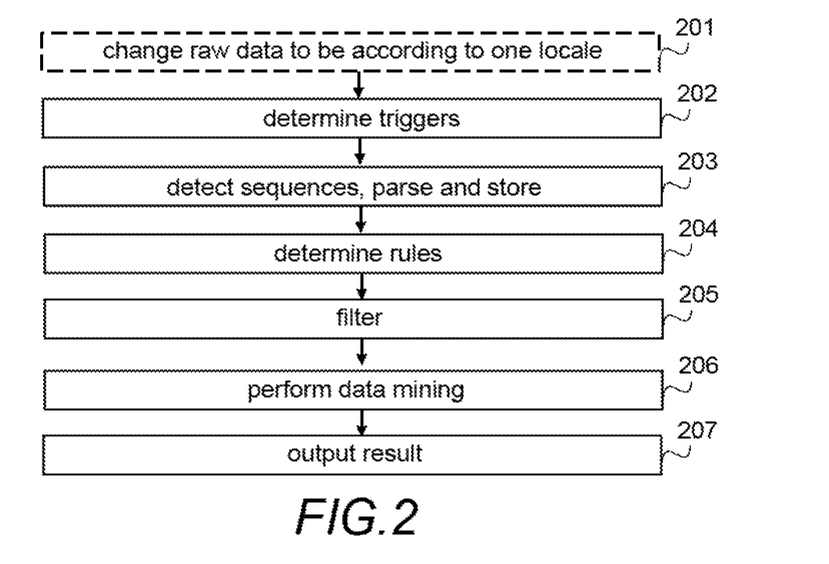
FIGS. 2 to 7 illustrate different exemplary functionalities.
Figure 3:
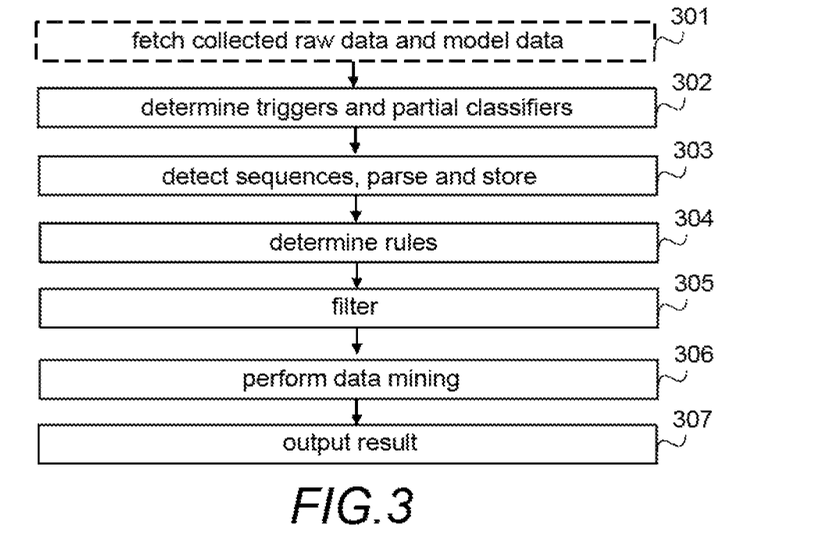
Figure 4:
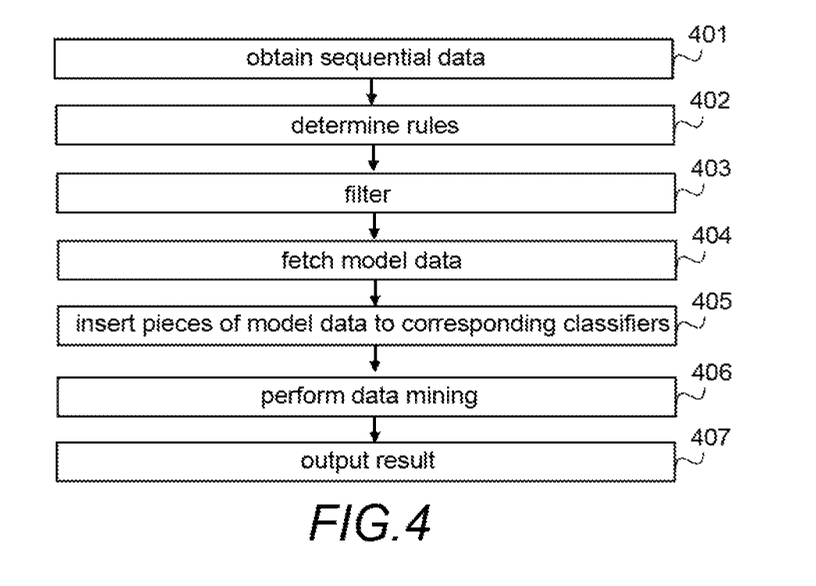

FIGS. 2, 3 and 4 are flow charts illustrating different functionalities of apparatuses comprising the sequential detection unit, the determination unit and the filtering unit, or more precisely functionalities of the corresponding units that may also be performed in a distributed manner. The functionalities differ from each other in that respect how model data is taken into account. In the below examples time, and especially timestamps, is used as the order information, without restricting the examples to time and timestamps. It is a straightforward solution for one skilled in the art to implement the examples to a solution using another way to indicate the order.

In the example of FIG. 2 it is assumed that raw data from a global database is used and no model data is available. Often creation oriented applications collect raw data from different users from different regions. Hence, the raw data may comprise variations to express the same type of information. For example, timestamps may be recorded differently. Therefore the obtained raw data may be changed in step 201 to be according to one locale. This way for example time will be in the same format in timestamps, and usable for positioning, and calculating last sequence user interface interaction instance, and for obtaining other time-related usage information if so required.

Triggers, also called herein trigger user interface interactions or trigger events, needed for detecting sequences, are determined in step 202. The triggers, or some of them, may be determined by fetching them from a memory where they are stored. Alternatively, or in addition to, the triggers may be received as user inputs. The triggers include one or more start triggers to detect a start of a sequence, and one or more end triggers to detect an end of the sequence. For a preliminary filtering, the triggers may comprise one or more ignore events to detect user interface interactions that are not to be included in the sequence, i.e. user interface interactions that are of no interest for the purpose(s) the sequences are created. For example, pressing "apply" button, or clicking a mouse are usually considered as user interface interactions of no interest, i.e. not revealing what has actually been performed.

Using the triggers, the raw data is processed to detect in step 203 sequences, to parse log entries in step 203, and to store in step 203 the parsed log entries at least temporarily. A parsed log entry may be in a form of a line or a row. For example, a parsed log entry may be processed into a list of basic elements consisting of a timestamp (time), command name (cmd), command-id (cmdId), target and an attribute field (attrib). The end result will be a structured collection of captured user sequences. Naturally, if the order information is not time information, or there is no need to add the time information to the user sequences, the basics elements may be command name (cmd) and/or command-id (cmdId), target and an attribute field (attrib).

The structured collection of captured user sequences may be directly analyzed further. However, in the illustrated example one or more rules for filtering are determined in step 204. The rules for filtering, i.e. filtering rules, may also be called as boundary conditions. The rules may be determined by fetching them, or some of them from a memory, where they are stored. Alternatively, or in addition to, the rules may be received as user inputs. The rules may be fetched for example based on the purpose of the use of the data. For example, the rules may be used to filter away all other sequences than those relating to a specific tool within a creation oriented application. After the rules are determined, the structured collection of captured user sequences will be filtered in step 205.

Then the filtered data is analyzed in step 206 using a mining algorithm. For example, BI-Directional Extension algorithm, Top-K Sequential Pattern algorithm, Compact Prediction Tree algorithms, or Markovian Models may be used in step 206. Examples of the Markovian Models include Markovian, All-k-Order Markov Chains (AKOM) and First order Markov Chains (PPM). The result is output in step 207 to a user via a user interface. The output may be a result of repetitiveness of commands within sequences of the same start trigger, or the same start trigger —end event pairs, an indication that there may be a usability issue in one or more certain tools of the creation oriented application, an indication that there are no usability issues, a prefilled (predicted) values for the next predicted command or action or tool, just to mention couple of examples. The main interest of analysing the sequential data, i.e. sequential pattern mining, is in finding subsequences in a set of sequences. A subsequence is called a frequent sequential pattern, or mere pattern, if it appears more than once in a set of sequences. The found patterns may then be used for different purposes, as will be described below with FIGS. 6 and 7, for example. For example, the most common workflow amongst different users can be detected to facilitate decisions in usability design to balance between usability and feature rich content of the creation oriented application in question.

In the illustrated example of FIG. 3 it is assumed that both the raw data and the model data are in the same format, i.e. no change to one locale is performed to the raw data or to the model data. For example, both the raw data and the model data may be country-specific or region-specific and/or company-specific, or even department-specific. However, should the raw data and/or the model data need change to one locale the change may be performed after the data is fetched.

Referring to FIG. 3, the raw data and the model data is fetched (retrieved) in step 301, unless already available. Depending on an implementation and how the data is collected the raw data may or may not comprise at least those pieces of the model data that are needed for data mining. If the raw data comprises at least the pieces of model data, they are fetched together in step 301. If the raw data and the model data are maintained separately, they are naturally fetched separately. For example, the raw data may be fetched first and then the model data may be fetched using the time information, or any suitable mapping information, in the raw data, or vice versa. The same time information may be sufficient to map the raw data and corresponding model data to each other. Another example is to use identification information of objects to map the raw data and the corresponding model data, provided that also the raw data comprises identification information.

Then, in the illustrated example, in step 302 triggers and partial classifiers are determined. The triggers may be determined as described above with step 202. In the illustrated example, partial classifiers are determined. A partial classifier means herein a piece of information, a separator, by means of which start triggers may be grouped for more distinct groups. Examples of partial classifiers include assembly name, part name, tool name, material, color, size, and any combination of them. To determine one or more partial classifiers the user may be prompted to provide partial classifiers that are to be used, and if the user provides no partial classifiers, the process may then continue as described above with FIG. 2, or default partial classifiers may be used. In a still further example the partial classifiers are predetermined classifiers. In the illustrated example it is assumed that at least one partial classifier is determined.

Using the triggers and the at least one partial classifier, the combination of the raw data and the model data is processed to detect in step 303 sequences, to parse log entries in step 303, and to store in step 303 the parsed log entries, that may be in a form of a line or a row, at least temporarily. For example, a parsed log entry may be processed into a list of basic elements consisting of a timestamp (time), partial classifier(es), command name (cmd), command-id (cmdId), target and an attribute field (attrib). In another example the basic element is composed of partial classifier(es) and/or command name (cmd) and/or command-id (cmdId) and/or target and/or an attribute field (attrib). The end result will be a target-oriented structured collection of captured user sequences. The target oriented means herein that the modeled objects can be taken into account more specifically. For example, sequences having a partial classifier indicating the assembly created, allow a more versatile data mining than sequences without a partial classifier. Naturally, the more partial classifiers are included, the more focused (target oriented) the data mining may be.

The structured collection of captured user sequences may be directly analyzed further. However, in the illustrated example one or more rules for filtering are determined in step 304. The determining may be similar to what is described with FIG. 2. However, the filtering rules may also include rules that relate to partial classifiers. For example, a rule may be "filter away unless partial classifiers include wall and concrete". Then the process continues in step 305 to 307 as described above with steps 205 to 207, i.e. the sequences are filtered (step 305), data mining performed (step 306) and results outputted (step 307).

In the illustrated example of FIG. 4 the model data is separate from the raw data, and from the sequential data if stored separately, and default partial classifier settings are used without limiting the example to such a solution. Further, it is assumed that the model data is in the same format, i.e. no change to one locale is performed to the model data. However, should the model data need change to one locale the change may be performed after the model data is fetched.

Still a further assumption made is that the raw data and the sequential data also contain GUIDs, or other corresponding unique key that is used also in the model data to enable proper mapping.

Referring to FIG. 4, the sequential data is obtained in step 401. Depending on an implementation, the obtaining may include performing the process described with steps 201 to 203 in FIG. 2, or fetching data that has undergone such a process and that has been stored, for example to the database comprising the sequential data. Then the rules are determined in step 402 and data filtered in step 403, for example as described above with steps 204 and 205, correspondingly.

When the filtered sequences are ready or when filtering the sequences or before that, model data is fetched in step 404. Then to a classifier of each filtered sequence, pieces of corresponding model data, found based on the unique key in the sequence and in the model data, are inserted in step 405 so that the sequences have classifiers (partial classifiers). Inserting the pieces of model data to classifiers after filtering has the advantage that less mapping is needed (and mapping is not performed to sequences that will be filtered away). It should be appreciated that the unique key itself cannot form part of the classifier, since the classifier is more generic. For example, there may be several objects, each having a unique identifier, one example being c2454994-fa0b-492d-8e28-b0436d59210a, having following model data: object name=SW-H, assembly name=Sandwich-H, main part profile: WB1200-16-40*500/150. The pieces of model data, or some of them, may be used as the (partial) classifier. For example, if a single line entry in a sequence is "t1, cmd, (cmdname, target, attribute, GUID), after adding the model data the sequence may be "t1, cmd, SW-H, Sandwich-H, WB1200-16-40*500/150, (cmdname, target, attribute, GUID)".

Then the process performs data mining in step 406 and outputting results in step 407, as described above with steps 206 and 207.

Assuming a following pseudo log file
t1, CommandStart 'toolNameN',"
t2, ToolDiag, tab1, field2, '500 mm'
t3, ToolDiag, tab1, field3, '5 pcs'
t4, MouseButtonDown 'x, y'
t5, OpenWeldDiag
t6, WeldDiag, tab2, field6, 'Bevel'
t7, Dialog 'Close'
t8, ToolSelect, item1
t9, ToolSelect, item2
t10, saveAs 'Setting for A500 Beams'
being stored as log file with log entries (for the sake of clarity, GUIDs are left out):
t1, user action 6,
t2, user action 7, attribute values 24, {2, 20}
t3, user action 7, attribute values 24, {3, 15}
t4, user action ack,
t5, user action 8,
t6, user action 9, attribute values 11, {6, 18},
t7, user action ack,
t8, user action 10, target1,
t9, user action 10, target2,
t10, user action store
and a data model with following data:
t8, assembly1 attribute values to attribute array
t9, assembly2 attribute values to attribute array
with start trigger "user action 6", end trigger "store", and ignore event "ack" and filtering rule "filter end trigger", using the process of FIG. 2, following sequence comprising user actions and user inputs to attribute fields will be obtained:

s1=<t1, {6}, {7, 24, 2, 20}, {7, 24, 3, 15}, {8}, {9, 11, 6, 18}, {50}> whereas using the process of FIG. 3 or 4, i.e. combining the information in the data model, using the time information, with the raw data following sequences comprising model data (e.g. BM object data), user actions and user inputs to attribute fields will be obtained:

s1=<t1, {10, attribute array}, {6}, {7, 24, 2, 20}, {7, 24, 3, 15}, {8}, {9, 11, 6, 18}, {50}>

Using the above example with an additional filtering rule "no user action names after start",
the sequence using process of FIG. 2 will be:

s1=<t1, {6}, {24, 2, 20}, {24, 3, 15}, {8}, {11, 6, 18}, {50}> and using process of FIG. 3 or 4:

s1=<t1, {attribute array}, {6}, {24, 2, 20}, {24, 3, 15}, {11, 6, 18}, {50}>

As is evident, the latter sequences obtained using process of FIG. 3 or 4 provide a more unique sequences. Thanks to that a data mining algorithm may detect differences on use of different tools, for example, more easily.

It should be appreciated that the above is only a highly simplified example, and illustrates what can be obtained from a very short log file. In real world, the amount of sequences may be huge, and may vary depending on filtering rules used.

Figure 5:
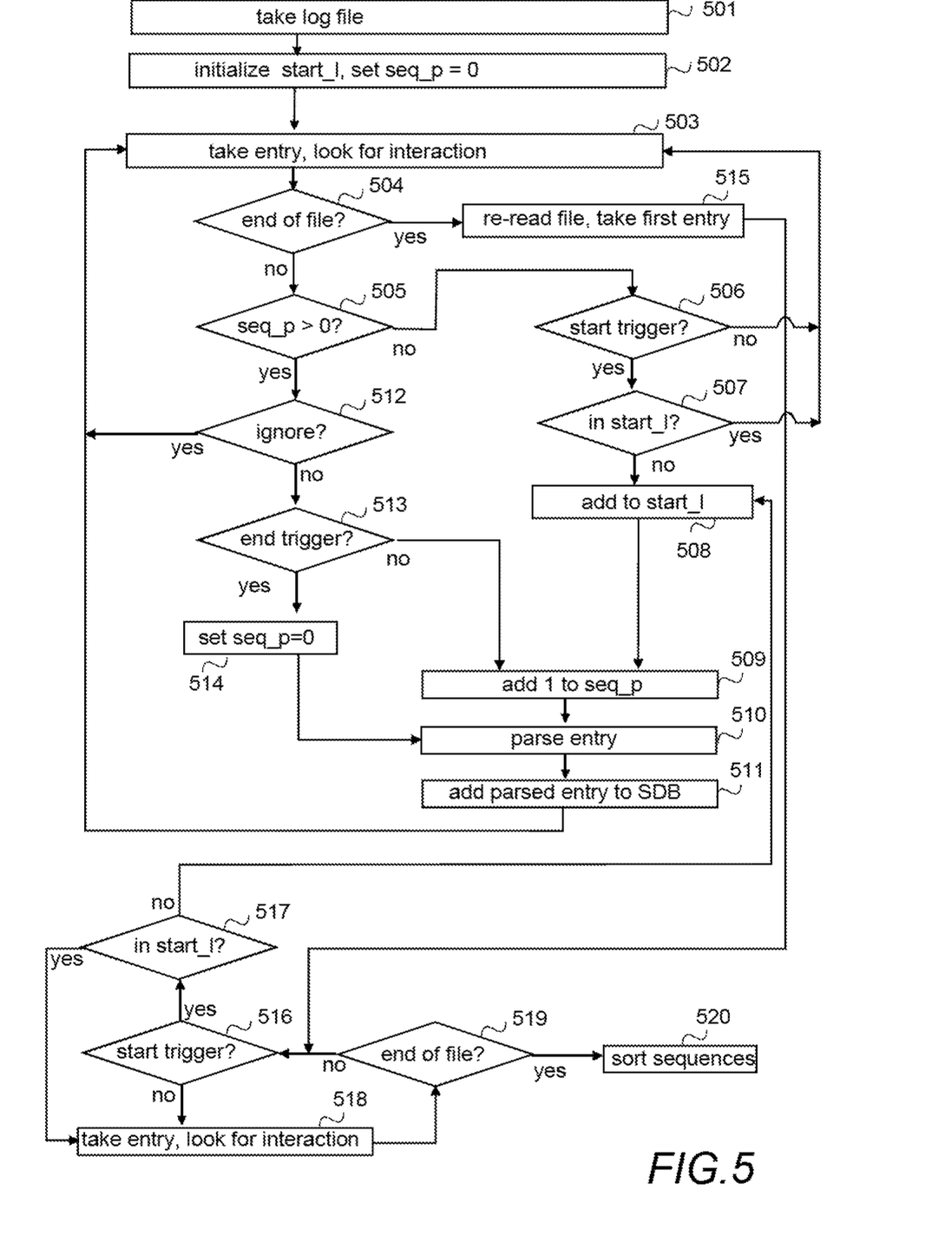

FIG. 5 is a flow chart illustrating a more detailed exemplified functionality how to create entries (content) to the sequential database, or more precisely exemplified functionality of the sequential detection unit. The process described in FIG. 5 concentrates how a log file comprising raw data in plurality of log entries is processed. Naturally the process is repeated to all those log files in the database for raw data that are to be processed. For example, only log files created during certain time interval, and/or created by certain entities/entity may be processed, or all log files are processed. Further, the log files may be processed in real-time or almost on real-time, i.e. when a log file is collected, or when one or more log files are stored to the database for raw data, for example. In the illustrated example the log files are processed a log file after a log file. A log file is a file created automatically by the creation oriented application tracking the user interface inputs of a user. Further, it is assumed that the tracked inputs in a log file are stored as log entries.

In the illustrated example it is also assumed that the triggers and events are predefined (preset). Naturally one or more of them can be received as user input. The triggers comprise one or more start triggers (specific user interface interactions, called also commands) and one or more end triggers (specific user interface interactions), as an end event (or end trigger) a maximum time delay t to detect end. There may be zero or more ignore events (user interface interactions to be ignored) that in turn determines "valid" user interface interactions—a valid user interface interaction is of interest and therefore not ignored, a user interface interaction of no interest is ignored. Naturally instead of defining ignore events, user interface interactions of interest may be defined.

Referring to FIG. 5, when a log file is taken to be processed in step 501 a temporary aid tool start list (start_l) is initialized in step 502 for the log file and a variable tracking the position in the sequence, seq_p is set in step 502 to be zero.

Then a first unprocessed log entry in the log file is taken in step 503 and the user interface interaction in the log entry is looked for in step 503.

If the user interface interaction is not end of file (step 504: no) it is checked in step 505, whether or not the value of seq_p is more than zero (i.e. one or more). If the value of the seq_p is zero (step 505: no), it is checked in step 506 whether or not the user interface interaction is one of the one or more start triggers. If the user interface interaction is not a start trigger (step 506: no), the process returns to step 503 to take the next unprocessed log entry to be processed.

If the user interface interaction is a start trigger (step 506: yes), it is checked in step 507, whether or not the log entry can be found in the start list, start_l. If the log entry is in the start list (step 507: yes), the process returns to step 503 to take the next unprocessed log entry to be processed.

If the log entry is not in the start list (step 507: no), the log entry is added in step 508 to the start list and the value of the seq_p is incremented in step 509 by adding 1 to the value seq_p. Then the log entry, possibly with model data, is parsed in step 510 to be according to the predetermined format. The format may be for example as follows: seq_p value, time, command, target and attribute, and the parsed log entry will have values for those fields for which the original log entry has values, and for which a value has been defined in previous steps. Depending on an implementation, if partial classifiers are added, they may be added at this stage, or later. Further, for each sequence a sequence identifier, may be determined and the sequence identifier may be added to be part of the parsed log entry. The parsed log entry is then added in step 511 to the database for storing sequential data, SDB. Then the process returns to step 503 to take the next unprocessed log entry to be processed.

If the value of the seq_p is more than zero (step 505: yes), the sequence is unfinished (not completed) and it is checked in step 512, whether or not the user interface interaction in the log entry is a user interface interaction of interest. In other words, it is checked, whether or not the user interface interaction is a user interface interaction that is to be ignored. If the user interface interaction is to be ignored (step 512: yes), the process returns to step 503 to take the next unprocessed log entry to be processed.

If the user interface interaction is not to be ignored (step 512: no), it is check in step 513 whether or not the user interface interaction is one of the end triggers. In other words, it is checked whether an end of the sequence is detected, either because of a specific user interface interaction (command) or because a time difference between the starting time of the sequence and the time in the log entry currently processed exceeds the maximum time delay or because of the end of the log file. If no end trigger is detected (step 513: no), the process proceeds to step 509 to increment the value of the seq_p.

If the user interface interaction is an end trigger (step 513: yes), the value of seq_p is set in step 514 to zero to indicate that the sequence is a complete sequence. Then the process proceeds to step 510 to parse a corresponding log entry.

If the end of file (step 504: yes) is detected, the log file is re-read in step 515 and a first log entry is taken in step 515, and it is checked in step 516, whether or not the first log entry contains a user interface interaction that is one of the start triggers. If the user interface interaction is a start trigger (step 516: yes), it is checked in step 517, whether or not the log entry can be found in the start list, start_l. If the log entry is not in the start list (step 517: no), the process proceeds to step 508 to add the log entry to the start list. By re-reading and maintain the start list it is ensured that if a log file contains more than one start trigger, for each start trigger found one sequence will be formed.

If the log entry is in the start list (step 517: yes), the next log entry is taken in step 518 and a user interface interaction is looked for in step 518. Then it is checked in step 519, whether or not the user interface interaction is an end of file. If not (step 519: no), the process proceeds to step 516 to check whether or not the user interface interaction is one of the start triggers. If the user interaction is not one of the start triggers (step 516: no), the process proceeds to step 518 to take the next log entry.

If the user interface interaction is the end of file (step 519: yes), the sequences added to the database are sorted in step 520 using the time information, such as the time stamp, associated with the start trigger of the sequence. Thanks to that, the sequences created from the log file processed in previous step will be in the database in correct positions (i.e. in time order) within the log file. In another implementation, the parsed entries are stored to a temporary list in 511, and stored to the sequential database only after they are sorted using the time information. It should be appreciated that when the sorting is performed log file—specifically, sequences are not in the database according to the time order, the time order applies within sequences created from the same log file.

Using the above described process, from following exemplified raw data:

9:50:33; CommandStart("ail_create_joint_by_one_sec", "134", "main_frame");
9:50:35; MouseDown("View_01 window_1", "View_01 window_1", 747, 651, 1);
9:50:35; MouseUp("View_01 window_1", "View_01 window_1", 747, 651, 0);
9:50:42; MouseDown("View_01 window_1", "View_01 window_1", 1033, 326, 1);
9:50:42; MouseUp("View_01 window_1", "View_01 window_1", 1033, 326, 0);
9:50:56; ValueChange("joint_134", "skew", "15");
9:51:07; ValueChange("modify_button", "joint_134");
9:51:09; MouseDown("View_01 window_1", "View_01 window_1", 1225, 228, 1);
9:51:09; MouseUp("View_01 window_1", "View_01 window_1", 1225, 228, 0);
9:51:22; TabChange("joint_134", "tw", "jointtab13");
9:51:27; ValueChange("joint_134", "edist3", "150");
9:51:33; ValueChange("modify_button", "joint_134");
9:52:36; ValueChange("joint_134", "saveas_file", "my_joint");
9:52:37; PushButton("saveas", "joint_134");
9:52:37; PushButton("OK_button", "joint_134");

With the following user interface interaction definitions:

Start Trigger = *CommandStart**

Ignore = Mouse*

End Trigger = *PushButton("saveas",**

= *PushButton("OK_button",**

= Cancel*

= maximum time delay 5 s

Following entries to the database comprising sequential data will be stored as one sequence isolated from the raw data:

9:50:33; CommandStart("ail_create_joint_by_one_sec", "134", "main_frame");
9:50:56; ValueChange("joint_134", "skew", "15");
9:51:07; ValueChange("modify_button", "joint_134");
9:51:27; ValueChange("joint_134", "edist3", "150");
9:51:33; ValueChange("modify_button", "joint_134");
9:52:36; ValueChange("joint_134", "saveas_file", "my_joint");
9:52:37; PushButton("OK_button", "joint_134");

As said, the above is one exemplified example, and in real life the format of the entries in the raw data and/or sequential data may be different and/or an entry may comprise less or more fields than in the example above.

Figure 6:
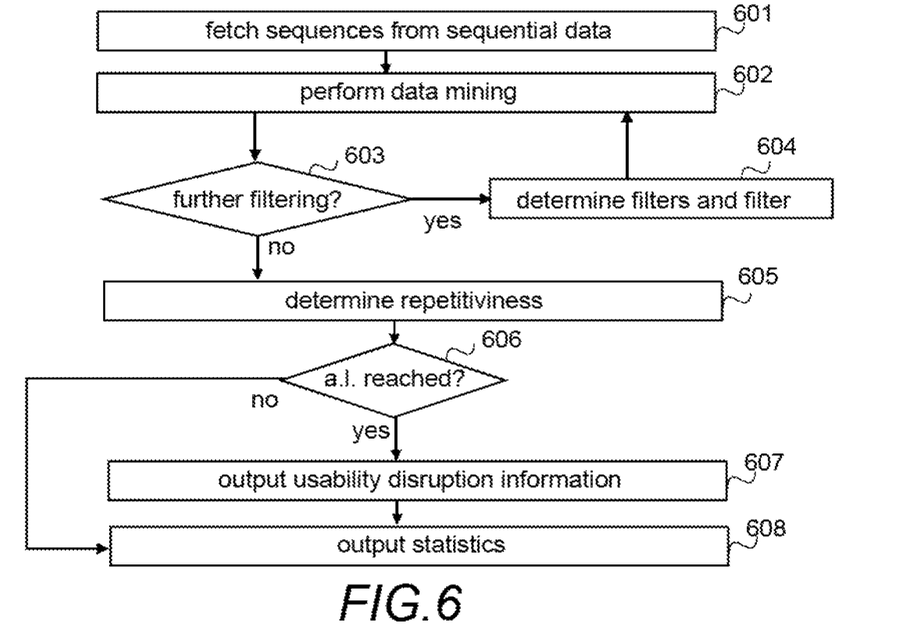
Figure 7:
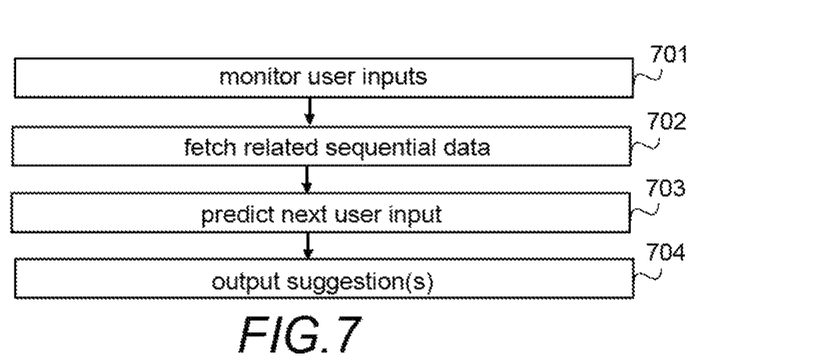

The thus created sequential data is usable for different data mining purposes, provided that the amount of sequences is big enough. For example, for properly performing a data mining of a tool, such as the tool "ail_create_joint_by_one_sec", at least hundreds of sequences are needed. Non-limiting use purposes are discussed with FIGS. 6 and 7. FIGS. 6 and 7 illustrate exemplified functionalities of the determination unit, and if data is filtered, exemplified functionality of the filtering unit. In the examples described with FIGS. 6 and 7 it is assumed that sequential data is fetched. It should be appreciated that instead of fetching the sequential data, filtered data, i.e. data obtained from the sequential data by filtering, if stored, may be fetched, and even further filtered.

Different statistical analysis can be performed from the sequential data, using different data mining algorithms. For example, data mining may be used to receive automatic information on situations where users are having difficulties to find correct tools, or to find automatically tools or toolsets that ultimately lead to usability breakdowns. Further, for an application provider it may be of interests which tools are the most often used. For example help action calls or help contents used may be searched for. Still further examples include obtaining user-specific workflow information, or mining user-specific workloads against each other in order to find a common workflow, if such exits. An advantage of using the sequential data to determine most often used tools instead of determining them directly from the raw data, is that in addition to a count also additional information will be received, for example information about the user interface and tool usage patterns.

Referring to FIG. 6, sequences from the database comprising the sequential data is fetched in step 601. Depending on the purpose, all sequential data or part of the sequential data may be fetched. For example, if a certain tool or toolset is under analysis, only data (sequences) relating to the tool may be fetched. Another example is that those sequences having a specific start trigger or/or end trigger and/or specific time may be fetched.

When the sequential data has been fetched, in the illustrated example a data mining is performed in step 602 to the fetched data. Then it is checked in step 603 whether or not further filtering is to be applied. For example, if high occurrences of known, generic Ok, Apply, Modify, Cancel, or tab change "tw"-commands is not of interest, they may be filtered away. Another example is that if there is no interest in inspecting high occurrence of transfers between a detailing tool and an application model view, further filtering might apply. The checking may be performed by prompting a user to define whether or not to filter, and/or what to filter. Alternatively, or in addition to that, certain further filtering rules may be predefined to the memory, for example analysis purpose—specifically, so that they will be applied without user involvement at this phase.

If the further filtering applies (step 603: yes), filters are determined in step 604 and the fetched sequential data is filtered in step 604 correspondingly. Then, the process returns to step 602 to perform data mining to the filtered sequential data.

If no further filtering takes places (step 603: no), the repetitiveness is determined in step 605. The repetitiveness may be determined by counting the number how many times a specific user interface action, or a specific combination of user interface actions has been performed. For example, a number of modify actions may be increased if a command is followed by a "modify". Another example includes counting common patterns by comparing sequences to each other to find a pattern in similar positions in the sequences or in a random position.

If after step 603 the sequences are:
s1=ABC
s2=BCA
s3=ABC
after step 605, the result can be:
count for ABC is 2
count for BCA is 1
count for AB is 2
count for BC is 3
count for CA is 1
count for A is 3
count for B is 3
count for C is 3

Thanks to this it is possible to form and output common patterns of sequences that are recognized or categorized as a task or interest. Examples of such include that a creator (user using the creation oriented application) adjusting tool n1 settings and applying it in a model is a sequence, and a creator opening a dialog box of interest (a dialog box is a specific tool to provide settings or attribute values) and recording interactions for next 1 minute as a sequence).

Then in the illustrated example, each number is compared in step 606 with a corresponding alert limit (a.l.) to determine whether or not the alert limit is reached. It should be appreciated that only some of the numbers may be compared. The alert limit may be a preset limit, received as a user input, or if the numbers are counted sequence-specifically in step 605, the alert limit may be an average or median number in sequences. This facilitates locating problems in applications. There are no restrictions how the alert limit is set. For example, the alert limit may be "a number of patterns with 3 or more shared features that have C as the second feature should not be more than one", or "if C occurs more than 3 times, alert".

If the alert limit (al) is reached (step 606: yes), information on usability disruption(s) that can be used for usability corrections is outputted in step 607. For example, an alert listing the situations, like "modify after changing beam geometry", "add reinforcement in beam reinforcement", "unexpected exit found in tool xx with alert limit n" may be outputted. Further, the output may contain a link/links, or an identifier/identifiers, based on which additional information can be obtained for example from the sequential database so that the user of the data mining results, called usually an evaluator, can study situations more closely.

In the illustrated example, in addition to the alerts, or if there are no alerts (step 606: no), statistical information is outputted in step 608 for further analysis. The statistical information may be outputted as a figure, for example, showing in one axis tool start action count, and in one axis tool name, and then for each tool number of all action starts and number of those containing sequences. If the order information is timestamps, or actual time between consecutive user interface interactions, the statistical information may provide, or be used for, time duration analysis, such as how much time is spent with this specific tool by average, or how much time did this specific phase took.

Another use example relates to predicting what a user is going to next do, as will be explained with FIG. 7.

Referring to FIG. 7, user inputs are monitored in step 701, and related sequential data, for example sequences relating to a tool the user has opened, is fetched in step 702. Although not illustrated, the fetched data may already be, or further filtered to be, for example, company-specific, department-specific or user-specific data.

Then the fetched data, and the data mining algorithm, such as the Markovian models, or Compact Prediction Tree+, will use the fetched data to predict in step 703 a next user input, and the predicted input is outputted in step 704 as a suggestion to the user. The suggestion for the next action may be a value to be given to an attribute, for example a prefilled dialog box, or a next phase in a workflow to be performed, for example opening a dialog box, or there combination, for example opening a dialog box with pre-filled attribute values. For example, a beam height may be provided, or suggestion "open end detailing tool" may be outputted. The fetched sequences may have been created as described above with FIG. 2, but with sequences created as described above with FIG. 3 or FIG. 4, preferably created user-specifically (creator-specifically) or creator-role specifically more accurate predictions can be created.

An example is that if a user input selecting "add a steal beam" is detected, the input can be used as a prediction prefix, and a user interface having as a suggestion "Ibeam" in the profile to be selected may be outputted. Using a more machine oriented language, if the user inputs corresponds to "1155, 1156, 74, 5", this can be used as a prediction prefix, and using the prediction prefix as keys, from the fetched related data, different inputs that in the fetched related data follow the prediction prefix, may be outputted. For example, the predicted user interface action could be in machine oriented language "1155, 1156, 74, 5, 83, 1030, 420, 31, 114, 59, 10, 153, 49", wherein the numbers in italics are the prediction.

Below an example how to implement the above described functionality to an exemplary creation oriented application is described an example of a creation oriented application in a building information modeling domain, the application being able to model structures that incorporate different kinds of building materials, including steel and concrete, and allows structural drafters and engineers to design a building structure and its tools using 3D modeling, generate 2D drawings and documentation, and access building information. For that purpose the application may have a plurality of built-in tools.

User workflow order in such an application is expected to consist of creation of modeling objects and later applying detailing tools. Typically the user applies a detailing tool from an applications and tools window or a side panel with default or saved settings. Applying the detail tool in the model functions by selecting each modeling object as input with the mouse. After viewing the results in model view, the user then decides if the selected tool representation is correct and suitable for solving the given structural design task. The next step is to open a detailing tool settings dialog and change necessary parameters to create an actual structural detail according to the exact design. Changing the parameters and modifying the changes iteratively is also common. If the used tool is not fully familiar to the user, partial changes and seeing the model changes visually help the user assess if the detail is correct. The detailing task commonly ends after the creation of preferred and correct detail. The user's individual detailing task can be assumed to end after using the detailing tool interface OK, Apply, Cancel, Save as or standard form close-command combinations. In rarer cases, users can leave the detailing tool open without leaving an exact trace of ending a detailing task. In these cases, the end is determined by the last specific tool related command before re-activation of the same tool, or starting a new detailing task with another tool.

Using the above information as trigger user interface interactions, and then performing data mining following sequence types that may indicate usability problems in a normal user detailing tool use process could be accurately detected and transformed into working detection models. A non-limiting list of examples include:

Repetitive search of a design tool
Repetitive tasks inside a design tool
Repetitive modify
Unexpected exit
Unexpected exit and search for similar design tool
Repetitive exit and return to design tool
Deleting created component created by design tool
Exploding created component created by design tool
Transaction delay between user interface interactions compared to other user data
Error: caused by design tool settings
Error: caused by incorrect pick position in 3D-view
Error: caused by incorrect object pick in 3D-view Using the above described ways to analyze sequential data originating from raw data, collected without any user involvement, it is possible to pinpoint areas of repetitive behavior that the user is facing without human interaction. Further, the problems are generalizable so that individual configurations for each tool is not required. For example, the generalizations may be divided into three levels of depth.

In the first depth level the user is not able to find the best suitable tools to perform required task. The first depth level is for receiving data about user search keywords and trending searches. This could be used to obtain certain user segments' typical search entries and into which tool these searches ultimately lead and whether the tool works for used objects. The level could include the recognition of the interval between search and tool launch until possible exit without using a tool. Additionally, the number of occurring searches in a short period of time until the tool launch could be included in this level. By using statistics created with these patterns, there is a possibility of automatic discovery in situations where users are having difficulties finding the correct tools. Searches could also indicate desired functionalities for future software development. In the first depth level the data has a clear detectable structure, a start trigger being a user search input and end trigger finding a correct detailing tool, for example. An example of such a structure is following (start trigger being bolded, end trigger in italic):
13:45:46; wpf.View(" . . . Find . . . SetText("column");
13:45:52; wpf.View(" . . . Find . . . SetText("concrete column");
13:46:01; wpf.View(" . . . Find . . . SetText("column shoe");
13:46:08; CommandStart("ail_create_plugin","Column-ShoeConnection", . . . .

In the second depth level the task that the user is trying to achieve has disruptions. The second depth is for minimizing human input in search of potential issues and for prioritizing the tasks for improving usability to tasks that have the highest statistical occurrence. This is a form of pattern detection that identifies occurrences with concretely or abstractly defined parameters in collected user interface interaction stream. Using construction from user interface interaction pattern recognition elements may reveal a single tool or toolset that causes usability breakdowns. The prerequisites for this analysis type require the creation of generalized and expected behavioral models as the basis for parameter definitions. For example, an evaluator may provide input to create or to assist the detection unit to create the models based on analysis results. The second depth has a requirement for inspecting detailing tools and the general actions that were used, but it does not specify the exact location in the dialog structure. For the most part, the used general actions are structures that have globally equal formatting and are offered as pre-made structures for detailing tool development. For example, using the example below, the second depth requires cmd column as a minimal requirement for sequential data analysis. In the below example sID means a sequence identifier, Seq_p means a sequence position, cmd is a combination of command and command identifier. It should be appreciated that the example is only one example and less specific and more specific minimum requirements may be used. A combination of the target and attrib values will reveal detailed information of the used tool. From the target value it is possible to see exact interface form item used. From the attribute value, it is also possible to extract the user input settings of individual tools.

| sId | sPos | time | cmd | target | attrib |
|---|---|---|---|---|---|
| 13d0812d | 1 | 2016-01-29 14:26:01 | 80000006 | | |
| 13d0812d | 2 | 2016-01-29 14:26:03 | TabChange | tw | |
| 13d0812d | 3 | 2016-01-29 14:26:09 | ValueChange | type | test |
| 13d0812d | 4 | 2016-01-29 14:26:10 | TabChange | tw | |
| 13d0812d | 5 | 2016-01-29 14:26:30 | filename_btn | | |
| 13d0812d | 6 | 2016-01-29 14:26:36 | ValueChange | dens | test1 |
| 13d0812d | 7 | 2016-01-29 14:26:44 | apply_button | | |
| 13d0812d | 8 | 2016-01-29 14:26:47 | TabChange | tw | |
| 13d0812d | 9 | 2016-01-29 14:26:56 | ValueChange | sname | test2 |
| 13d0812d | 10 | 2016-01-29 14:27:00 | ValueChange | pname | test3 |
| 13d0812d | 11 | 2016-01-29 14:27:00 | apply_button | | |
| 13d0812d | 12 | 2016-01-29 14:27:09 | OK_button | | |

In the third depth level a certain element within the user task is causing disruption. The third depth focuses on recorded data inside a certain task and it is for decreasing issues in finding the exact location of a disruption from a generalized level to an area in used tool structure. For example, user interface interaction patterns that evaluate tool dialog exit and time usage may be used to discover the disruption. The third level uses a similar approach than the above described second level. However, additional comparison elements, such the target and attribute values, for example, has to be used. In the third depth individual tool usage is compared and exact paths among captured sequences is recognized.

As a generalization, two methods are disclosed, storable to any memory means, and executable by any computer. One of the methods comprises at least fetching raw data in one or more log files on a creation oriented application, a log file comprising one or more collected user interface interactions with associated order information, a collected interaction being in the log file in a log entry and the creation oriented application being an application providing a user a plurality of ways to reach an end result; determining one or more start triggers, a start trigger defining a specific user interface interaction, and one or more end events, at least one end event defining a specific user interface interaction that is not defining a start trigger; and for each log file, creating, for each found start trigger in a log file a sequence by parsing a log entry comprising at least the start trigger and user interface interactions in log entries between the start trigger and an end trigger, associating the sequence with an identifier, and storing the thus formed sequence to a collection of sequential data. The other method comprises at least fetching, by a computing device, a plurality of sequences, a sequence comprising in a standard format at least a start user interface interaction, and possible further user interface interactions between the start event and an end event, each user interface interaction being associated with order information and being a user interaction performed when a user has used a creation oriented application, the creation oriented application being an application in which no optimal way to reach an end result exits;

applying, by the computing device, data mining to the sequences to find repetitive patterns in the sequences; and outputting, by the computing device, found repetitive patterns or information based on the found repetitive patterns.

As is evident from the above, problems in applications are more easily, and automatically located, thanks to the possibility to count user interface interaction-specific numbers, including counting actions in which a lot of time were spent. Hence no manual user input of a user using the creation oriented application and facing some problems is needed for a usability engineering. Further, it is possible, by using the above described sequence detection algorithms, to detect sequences from undefined types of data without a given optimal source or any other comparative target sequence. In other words, for application usability and application product development are provided ways to automatically recognize and predict usability and/or workflow related information, such as deficiencies and repetitive workflow.

The steps and related functions described above in FIGS. 2 to 7 are in no absolute chronological order, and some of the steps may be performed simultaneously or in an order differing from the given one. For example, instead of using the appearance order of different commands, one may determine a point in which the command is most frequently used, and then use the updated order. Still a further example include to use an order in which the command is placed below an average point of the connmand occurrence, just to take away testing of the command. Other functions can also be executed between the steps or within the steps. For example, in FIG. 6, after the statistics are outputted, the user may be prompted to provide further filtering rules, and then the process may return to step 604 to further filter the sequential data. Some of the steps or part of the steps can also be left out or replaced by a corresponding step or part of the step.

The techniques described herein may be implemented by various means so that an apparatus implementing one or more functions/operations described above with an embodiment/example, for example by means of any of FIGS. 2 to 7 and any combination thereof, comprises not only prior art means, but also means for implementing the one or more functions/operations of a corresponding functionality described with an embodiment, for example by means of any of FIGS. 2 to 7 and any combination thereof, and it may comprise separate means for each separate function/operation, or means may be configured to perform two or more functions/operations. For example, one or more of the means and/or a tree generation unit for one or more functions/operations described above may be software and/or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium (s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein.

Figure 8:
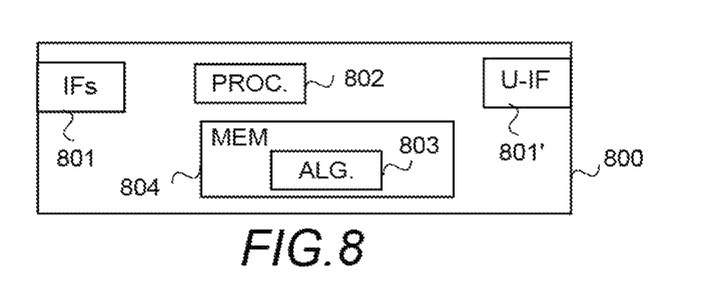
FIG. 8 is a schematic block diagram of an exemplary apparatus.

FIG. 8 is a simplified block diagram illustrating some units for an apparatus 800 comprising of the sequential detection unit and/or the determination unit and/or the filtering unit, or configured otherwise to perform at least some functionality described above, for example by means of any of FIGS. 2 to 7 and any combination thereof, or some of the functionalities if functionalities are distributed in the future. In the illustrated example, the apparatus comprises one or more interface (IF) entities 801, such as one or more user interfaces 801', one or more processing entities 802 connected to various interface entities 801 and to one or more memories 804.

The one or more interface entities 801 are entities for receiving and transmitting information, such as communication interfaces comprising hardware and/or software for realizing communication connectivity according to one or more communication protocols, or for realizing data storing and fetching. The one or more user interfaces 801' may be any kind of a user interface, for example a screen, a keypad, or an integrated display device or external display device.

A processing entity 802 is capable to perform calculations and configured to implement at least the sequential detection unit and/or the determination unit and/or the filtering unit, described herein, or at least part of functionalities/operations described above, for example by means of any of FIGS. 2 to 7 and any combination thereof, as a corresponding unit or a sub-unit if distributed scenario is implemented, with corresponding algorithms 803 stored in the memory 804. The entity 802 may include a processor, controller, control unit, micro-controller, unit, module, etc. suitable for carrying out embodiments or operations described above, for example by means of any of FIGS. 2 to 7 and any combination thereof. Generally the processor is a central processing unit, but the processor may be an additional operation processor.

A memory 804 is usable for storing a computer program code required for the sequential detection unit and/or the determination unit and/or the filtering unit, or a corresponding unit or sub-unit, or for one or more functionalities/operations described above, for example by means of any of FIGS. 2 to 7 and any combination thereof, i.e. the algorithms for implementing the functionality/operations described above by means of any of FIGS. 2 to 7 and any combination thereof. The memory 804 may also be usable for storing other possible information, like the temporarily stored information.

As a summary, each or some or one of the units/sub-units and/or algorithms for functions/operations described herein, for example by means of means of any of FIGS. 2 to 7 and any combination thereof, may be configured as a computer or a processor, or a microprocessor, such as a single-chip computer element, or as a chipset, or one or more logic gates including at least a memory for providing storage area used for arithmetic operation and an operation processor for executing the arithmetic operation. Each or some or one of the units/sub-units and/or algorithms for functions/operations described above, for example by means of means of any of FIGS. 2 to 7 and any combination thereof, may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed and/or will be programmed by downloading computer program code (one or more algorithms) in such a way to carry out one or more functions of one or more embodiments/examples.

An embodiment provides a computer program embodied on any client-readable distribution/data storage medium or memory unit(s) or article(s) of manufacture, comprising program instructions executable by one or more processors/computers, which instructions, when loaded into an apparatus, constitute the tree generation unit or an entity providing corresponding functionality, or at least part of the corresponding functionality. Programs, also called program products, including software routines, program snippets constituting "program libraries", applets and macros, can be stored in any medium and may be downloaded into an apparatus. In other words, each or some or one of the units/sub-units and/or the algorithms for one or more functions/operations described above, for example by means of means of any of FIGS. 2 to 7 and any combination thereof, may be an element that comprises one or more arithmetic logic units, a number of special registers and control circuits.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. An apparatus comprising
at least one processor; and
at least one memory including a computer program code for a building information modeling application, the building information modeling application for modeling one or more physical structures, the building information modeling application being an application in which no optimal way to reach an end result that models a physical structure exists, wherein the at least one memory and the computer program code are configured, with the at least one processor, to cause the building information modeling application to perform:
fetching, from a data storage of the at least one memory, a plurality of sequences created from raw data, which has been generated by collecting, from a plurality of user apparatuses, user interface interactions while the building information modeling application has been running, the user interface interactions including any use of user interface means and any modeling input, modeling inputs comprising a plurality of different commands, actions and values to different attribute fields, each sequence comprising in a same standard format at least a start user interface interaction, and possible further user interface interactions between a start user interface interaction and an end event, each user interface interaction being associated with order information and being a user interaction performed when a corresponding user has used the building information modeling application;
applying data mining to the fetched sequences to find repetitive patterns in the sequences, wherein a pattern is a specific user interface interaction or a specific combination of user interface interactions;
monitoring user inputs when a user is using the building information modeling application;
using a modeling input and related found repetitive patterns comprising the modeling input in the fetched sequences to predict in real time the user's next modeling input; and
outputting in real time via a user interface of the building information modeling application to the user of the building information modeling application, a predicted user input as a suggestion for the user's next modeling input.

2. The apparatus of claim 1, wherein the at least one memory and the computer program code are configured, with the at least one processor, to cause the apparatus to further perform:
determining one or more filtering rules;
filtering the fetched sequences according to the one or more filtering rules; and
applying the data mining after filtering.

3. The apparatus of claim 2, wherein the at least one memory and the computer program code are configured, with the at least one processor, to cause the apparatus to further perform:
determining after the data mining one or more further filtering rules;
performing filtering according to the one or more further filtering rules; and
reapplying the data mining after filtering to the filtered set of sequences.

4. The apparatus of claim 1, wherein the at least one memory and the computer program code are configured, with the at least one processor, to cause the apparatus to further perform:
determining at least one alerting limit to be used for one or more patterns;
comparing the number of occurrences of patterns with corresponding alerting limit; and
if the number reaches the corresponding alerting limit, outputting, by the computing device, a usability problem alert.

5. The apparatus of claim 4, wherein the at least one memory and the computer program code are configured, with the at least one processor, to cause the apparatus to further perform the determining at least one alerting limit by at least receiving one or more alerting limits as a user input.

6. The apparatus of claim 1, wherein the at least one memory and the computer program code are configured, with the at least one processor, to cause the apparatus to further perform the data mining by applying BI-Directional Extension algorithm or Top-K Sequential Pattern algorithm.

7. The apparatus of claim 1, wherein the at least one memory and the computer program code are configured, with the at least one processor, to cause the apparatus to further perform:
monitoring user inputs when the user is using the building information modeling application;
using an input and the repetitive sequences to predict user's next action; and
outputting a suggestion for the next action as the information based on the found repetitive patterns.

8. The apparatus of claim 7, wherein the at least one memory and the computer program code are configured, with the at least one processor, to cause the apparatus to further perform outputting, as at least part of the suggestion for the next action, a suggestion to a value to be given to an attribute or a next phase to be performed in a workflow.

9. The apparatus of claim 4, wherein the at least one memory and the computer program code are configured, with the at least one processor, to cause the apparatus to further perform the data mining by applying Compact Prediction Tree algorithm or by applying one of the Markovian Models.

10. The apparatus of claim 1, wherein the at least one memory and the computer program code are configured, with the at least one processor, to cause the apparatus to further perform fetching the sequences from a collection of sequential data that is formed by performing steps comprising:
fetching raw data, which has been generated by collecting data on user interactions with the running building information modeling application, and which collected data has been stored in one or more log files, a log file comprising one or more collected user interface interactions with associated order information, a collected user interface interaction being in the log file in a log entry;
determining one or more start triggers, a start trigger defining a specific user interface interaction, and one or more end events, at least one end event defining a specific user interface interaction that is not defining a start trigger;
for each log file, creating, for each found start trigger in a log file, a standard format sequence, which comprises fields in a specific order, by parsing a log entry comprising at least the start trigger and user interface interactions in log entries between the start trigger and an end trigger, associating the sequence with an identifier, and storing the thus formed sequence to the collection of sequential data.

11. A computer implemented method comprising:
starting in a computing device a building information modeling application for modeling one or more physical structures, the building information modeling application being an application in which no optimal way to reach an end result that models a physical structure exits;
fetching, by the building information modeling application, from a data storage, a plurality of sequences created from raw data, which has been generated by collecting, from a plurality of user apparatuses, user interface interactions while the building information modeling application has been running, the user interface interactions including any use of user interface means and any modeling input, modeling inputs comprising a plurality of different commands, actions and values to different attribute fields, each sequence comprising in a same standard format at least a start interface interaction, and possible further user interface interactions between a start user interface interaction and an end event, each user interface interaction being associated with order information and being a user interaction performed when a corresponding user has used the building information modeling application;
applying, by the building information modeling application, data mining to the fetched sequences to find repetitive patterns in the sequences, wherein a pattern is a specific user interface interaction or a specific combination of user interface interactions;
monitoring, by the building information modeling application, user inputs to when a user is using the building information modeling application;
using, by the building information modeling application, a modeling input and related found repetitive patterns comprising the modeling input in the fetched sequences to predict in real time user's next modeling input; and
outputting in real time, by the building information modeling application, via a user interface of the building information modeling application to a user of the building information modeling application, a predicted user input as a suggestion for the user's next modeling input.

12. A computer implemented method comprising:
starting in a computing device a usability application for studying usability of a building information modeling application, which is an application for modeling one or more physical structures in which no optimal way to reach an end result that models a physical structure exits;
fetching, by the usability application, from a data storage, a plurality of sequences created from raw data, which has been generated by collecting, from a plurality of user apparatuses, user interface interactions while the building information modeling application has been running, the user interface interactions including any use of user interface means and any modeling input, modeling inputs comprising a plurality of different commands, actions and values to different attribute fields, each sequence comprising in a same standard format at least a start user interface interaction, and possible further user interface interactions between the start user interface interaction and an end event, each user interface interaction being associated with order information and being a user interaction performed when a user has used the building information modeling application;
applying, by the usability application, data mining to the sequences to count for patterns in the sequences their number of occurrences, wherein a pattern is a specific user interface interaction or a specific combination of user interface interactions;
determining, by the usability application, at least one alerting limit to be used for one or more patterns;
comparing, by the usability application, the number of occurrences of patterns with corresponding alerting limit; and
if the number reaches the corresponding alerting limit, outputting, by the usability application, via a user interface of the usability application, to a user of the usability application, information on a corresponding usability disruption in the building information modeling application for usability corrections.

13. An apparatus comprising:
at least one processor; and at least one memory including a computer program code for a usability application, the usability application for studying usability of a building information modeling application, which is an application modeling one or more physical structures in which no optimal way to reach an end result that models a physical structure exists, wherein the at least one memory and the computer program code are configured, with the at least one processor, to cause the usability application to perform steps comprising:

fetching from a data storage of the at least one memory, a plurality of sequences created from raw data, which has been generated by collecting, from a plurality of user apparatuses, user interface interactions while the building information modeling application has been running, the user interface interactions including any use of user interface means and any modeling input, modeling inputs comprising a plurality of different commands, actions and values to different attribute fields, each sequence comprising in a same standard format at least a start user interface interaction, and possible further user interface interactions between a start user interface interaction and an end event, each user interface interaction being associated with order information and being a user interaction performed when a user has used the building information modeling application;

applying data mining to the sequences to count for patterns in the sequences their number of occurrences, wherein a pattern is a specific user interface interaction or a specific combination of user interface interactions;

determining at least one alerting limit to be used for one or more patterns;

comparing the number of occurrences of patterns with a corresponding alerting limit; and if the number reaches the corresponding alerting limit, outputting via a user interface of the usability application, to a user of the usability application, information on a corresponding usability disruption in the building information modeling application for usability corrections.

14. The apparatus of claim 13, wherein the sequences are fetched from the data storage comprising a collection of sequential data that comprises sequences formed by performing steps comprising:

fetching the raw data stored in one or more log files, a log file comprising one or more collected user interface interactions with associated order information, a collected user interface interaction being in the log file in a log entry;

determining one or more start triggers, a start trigger defining a specific user interface interaction, and one or more end events, at least one end event defining a specific user interface interaction that is not defining a start trigger; and for each log file, creating, for each found start trigger in a log file, a standard format sequence, which comprises fields in a specific order, by parsing a log entry comprising at least the start trigger and user interface interactions in log entries between the start trigger and an end trigger, associating the sequence with an identifier, and storing the thus formed sequence to the collection of sequential data.

15. The apparatus of claim 14, wherein forming the sequences further comprises including the end event to the parsing.

16. The apparatus of claim 14, wherein forming the sequences further comprises:

determining one or more user interface interactions to be ignored; and in response to a log entry in a log file comprising a user interface interaction to be ignored, skipping over the log entry without parsing and storing the log entry.

17. The apparatus of claim 14, wherein the order information is time information and forming the sequences further comprises associating in the sequence the identifier with a corresponding time information.

18. The apparatus of claim 17, wherein forming the sequences further comprises:

fetching building information modeling data comprising modeling actions defining what has been created and how it has been created, a modeling action being associated with a creation time;

adding to a sequence one or more pieces of building information modeling data, each piece being associated with a user interface interaction whose occurrence time corresponds to a creation time of the piece.

19. The apparatus of claim 14, wherein the order information is time information and one of the events is a maximum time delay between consecutive user interface interactions expiring.

20. The apparatus of claim 13, wherein the data mining is performed by applying BI-Directional Extension algorithm or Top-K Sequential Pattern algorithm.

21. The apparatus of claim 13, wherein the data mining is performed by applying Compact Prediction Tree algorithm or by applying one of the Markovian Models.

22. The apparatus of claim 13, wherein the at least one memory and the computer program code are configured, with the at least one processor, to cause the usability application to further perform steps comprising:

determining one or more filtering rules;

filtering the fetched sequences according to the one or more filtering rules; and applying the data mining after filtering.

* * * * *